July 15, 1969    J. J. WERTH ET AL    3,455,744

LITHIUM-HALOGEN FUEL CELL AND METHOD OF PRODUCING ELECTRICITY

Filed April 14, 1966

INVENTOR.
John J. Werth
BY  & David P. Lake
R. J. Wallace
ATTORNEY

United States Patent Office 3,455,744
Patented July 15, 1969

3,455,744
LITHIUM-HALOGEN FUEL CELL AND METHOD
OF PRODUCING ELECTRICITY
John J. Werth, Santa Barbara, and David P. Lake, Goleta,
Calif., assignors to General Motors Corporation, Detroit, Mich., a corporation of Delaware
Filed Apr. 14, 1966, Ser. No. 542,576
Int. Cl. H01m 27/26, 27/14
U.S. Cl. 136—86   15 Claims This invention relates generally to fuel cells of the fused lithium/lithium halide/halogen type. More specifically, it relates to new methods for the regeneration of the halogen from the halide.

It has long been the aim of the industry to perfect an air breathing fuel cell system which has minimum heat waste, relatively low temperature operating conditions, relatively high specific energy (watt-hours/pound) and minimum reactant and product storage requirements. Such a system is possible. The overall reaction for this system is:

$$2Li + \tfrac{1}{2} O_2 \rightarrow Li_2O$$

It is, at best, impractical to *directly* consume oxygen from the air in the fuel cell itself with the attendant formation of $Li_2O$. The $Li_2O$ formed is a poor electrolyte by itself and hence the cell would require additional salts to enhance the characteristics of the $Li_2O$. The concentration of the additive salts would vary as the $Li_2O$ is produced resulting in non-uniform electrolyte performance. It likewise is impractical to *directly* consume oxygen from the air because of the nitrogen dilution of the oxygen in the air in the cathode chamber of the fuel cell where the concentration of the oxidant should be maximum.

It is therefore an object of this invention to provide an air breathing fuel cell system.

A further object of this invention is to provide a fused salt, air breathing fuel cell system which operates at relatively low temperatures.

A further object of this invention is to provide a fused salt, air breathing fuel cell system which operates with a minimum loss of heat energy.

A further object of this invention is to provide a fused salt, air breathing fuel cell system which operates with relatively high specific energies (watt-hours/pound).

A further object of this invention is to provide a fused salt, air breathing fuel cell system which operates with minimum reactant and product storage requirements.

A further object of this invention is to provide a process for effecting the production of electrical energy from the electrochemical consumption of lithium and oxygen in a system which offers low temperature operating conditions, a minimum of waste heat, high specific energies (watt-hours/pound) and a minimum of reactant and product storage space.

These and other objects and advantages of this invention will become apparent from the following detailed discussion of one embodiment of this invention.

I have devised a fuel cell system possessing all of the desirable characteristics recited above. The system which effects these characteristics has an overall reaction which corresponds to the equation:

$$2Li + \tfrac{1}{2} O_2 \rightarrow Li_2O$$

However, to effect this overall reaction consistent with the objects of the invention, I have found it necessary to employ at least two intermediate reactions which, in the case of a $Li/LiI/I_2$ cell corresponds to the following equations:

(1) Fuel cell:
Anode: $2Li \rightarrow 2Li^+ + 2e^-$
Cathode: $I_2 + 2e^- \rightarrow 2I^-$
Overall: $2Li + I_2 \rightarrow 2LiI$ (2) Regeneration:

$$2LiI + \tfrac{1}{2} O_2 \rightarrow Li_2O + I_2$$

Figure 1:
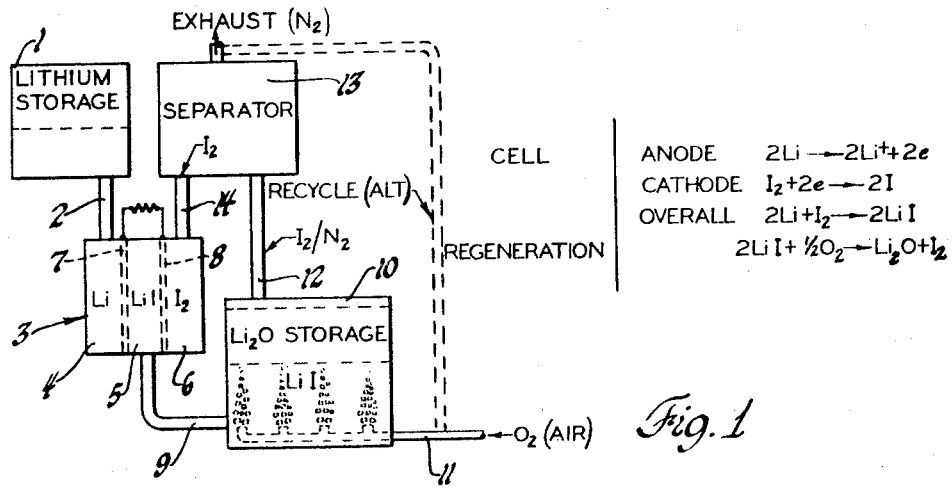
FIGURE 1 is a schematic representation of a system employing this invention.

It is significant to note that of all the combinations of known alkali metals and halogens, only lithium, iodine and bromine, when reacted substantially in accordance with the above-recited formulae, will operate satisfactorily without either the application or removal of substantial quantities of external heat to the operating system. Many of the other possible chemical combinations recited hereafter have regeneration reactions which are strongly endothermic and hence require the application of considerable quantities of heat. In this class are such compounds as sodium, potassium, cesium, and rubidium halides and lithium, calcium, barium, strontium, and beryllium chlorides. Likewise, other groupings are strongly exothermic and hence generate considerable quantities of wasted heat energy. In this class are compounds such as magnesium and beryllium bromides and iodides. The use of calcium, barium or strontium compounds is also undesirable owing to the relatively high meltisg points of the metals themselves. Likewise strontium, barium, potassium, cesium and rubidium are undesirable because of their relatively low specific energy output (watt-hours/pound). Of all the possible combinations and permutations of the known fuel metals and halogens, lithium, iodine and bromine combinations alone possess the thermodynamic properties best suited to the satisfaction of the thermal requirements of this system.

Unfortunately as in the case of a $Li:O_2$ system, the preferred embodiment, a competing chemical reaction occurs in the iodine regenerator forming Lithium peroxide according to the following reaction:

$$3Li_2O + \tfrac{3}{2} O_2 \rightarrow 3Li_2O_2$$

The $Li_2O_2$ thus formed subsequently reacts with the incoming LiI to form lithium paraperiodate which is believed to be formed *generally* according to the following reaction:

$$2Li_2O_2 + LiI + O_2 \rightarrow Li_5IO_6$$

This paraperiodate formation reaction consumes and ultimately ties up as much as 20% of the iodine which could otherwise be available for use within the fuel cell stage of the system. The iodine thus tied up cannot be released at the normal operating temperatures of the system. Recovery can only be obtained by resorting to much higher temperatures, at which higher temperatures the paraperiodates are thermally decomposable. Therefore, at normal operating temperatures the iodine consumed by the paraperiodate is effectively lost to the system. This loss, like the requirement for or loss of excess quantities of heat is undesirable from a system efficiency standpoint.

By the method of our invention, we have found that we can avoid the formation of paraperiodate and release substantially all of the iodine from lithium iodide.

Briefly stated, our invention comprehends the reaction of lithium iodide with oxygen in such a way as to prevent the formation of lithium peroxide which in turn reacts to form paraperiodate whereby increased amounts of iodine is regenerated. We effect this increase of iodine regeneration by a process which forces limited amounts of oxygen upwardly through a regeneration chamber.

Owing to the density differences between $Li_2O$ and LiI, the lighter $Li_2O$ floats on the top of the heavier LiI. By admitting controlled amounts of air at substantially the lowest point in the regenerator, it must, of necessity, first come in contact with the LiI before it can contact and react with the $Li_2O$ to form $Li_2O_2$ which $Li_2O_2$ formation alone initiates the competing reaction. The air input is adjusted so that the oxygen is chemically consumed by the lithium iodide before it can react with the $Li_2O$. Substantially no oxygen remains after bubbling through the LiI to combine with the lithium oxide floating atop the LiI. Hence the formation of lithium peroxide is precluded with the result that substantially all of the iodine is liberated for reuse within the system. The flow rate of the incoming air may be varied depending on the other operating conditions of the system, hence, such factors as the head of molten LiI in the regenerator and temperature are significant variables. The rate of air input required to effect the maximum $I_2$ recovery is one which produces at the $Li_2O$-LiI interface a gas bubble having an oxygen content of no more than 0.1% by volume. As the $O_2$ content of the bubble at the interface increases, the percent recovery of $I_2$ declines. At $O_2$ concentrations of less than 0.1% by volume substantially all of the $I_2$ is recovered. We have observed that even at $O_2$ concentrations in the order of 0.3% by volume, the $I_2$ recovery is only 97%.

Referring to FIGURE 1, tank No. 1 serves to store the lithium, either in solid or liquid form, and may be constructed from stainless steel, iron, or any other acceptable material capable of withstanding attack by the lithium. The lithium from tank 1 is conveyed to anode chamber 4 of fuel cell 3 via any acceptable conduit means 2, a capillary tube being preferred. The lithium in anode chamber 4 is separated from the lithium iodide electrolyte in chamber 5 by means of a porous separator or mesh element 7 which holds the liquid lithium in place. The element 7 may itself be the lithium electrode of any acceptable type known to the art, or it may serve merely to separate the respective chambers with the electrode contact being made from the anode chamber wall (not shown). Regardless of which system is employed, appropriate electrical insulators (not shown) are required to electrically isolate the chambers 4 and 6 one from the other. Electrolyte chamber 5 serves to maintain the electrolyte in proper relation relative to the lithium separator 7 and the iodine electrode 8. The electrolyte contained within the chamber 5 is the product of the electrochemical reaction between the respective electrode materials. It is generally maintained at a temperature slightly above its melting point (450° C. to 500° C. for lithium iodide). The lithium iodide electrochemically formed in chamber 5 is piped to an iodine regenerator 10 by overflow tube 9 or the like. The iodine regenerator 10 comprises simply a chamber having a lithium iodide inlet, an iodine and waste gas outlet, and an air or oxygen inlet located at substantially the lowest point of the regenerator which will permit maximum distribution and dissipation of the inflowing air through the head of molten lithium iodide and lithium oxide. Any suitable gas diffusion means may be affixed to the ends of the air inlet, if so desired. The regenerator 10 actually performs two functions. The regenerator's prime function, of course, is the regeneration of iodine from the lithium iodide. However, as is depicted in FIGURE 1, the lithium oixde which results from the lithium iodide conversion and which is lighter than the lithium iodide, floats to the surface of the lithium iodide where it remains during the course of the system's operation. The result, therefore, is that as the lithium is consumed and ultimately converted to lithium oxide in the iodine regenerator, the volume of lithium oxide therein is increased and will eventually fill the regenerator chamber 10. Hence the regenerator 10 serves a dual function, the first being that of iodine regeneration, and the second being that of lithium oxide storage. The iodine and waste gas generated in the regenerator 10 is conveyed to a separator 13, via conduit means 12. Separator 13 may comprise any of the known or accepted gas separator devices and does not specifically constitute a part of this invention. However, a preferred separator comprises one in which the iodine is partly condensed and the uncondensed fraction selectively absorbed in charcoal filters through which the nitrogen waste must traverse before it can be released to the atmosphere. A plurality of such filters may be combined in series to effect maximum adsorption. The entrapped iodine is then intermittently released from the filters as required. The thus separated iodine is conveyed to the cathode chamber 6 of fuel cell 3, wherein it is electrochemically reacted with the lithium by means of iodine electrode 8.

Figure 2:
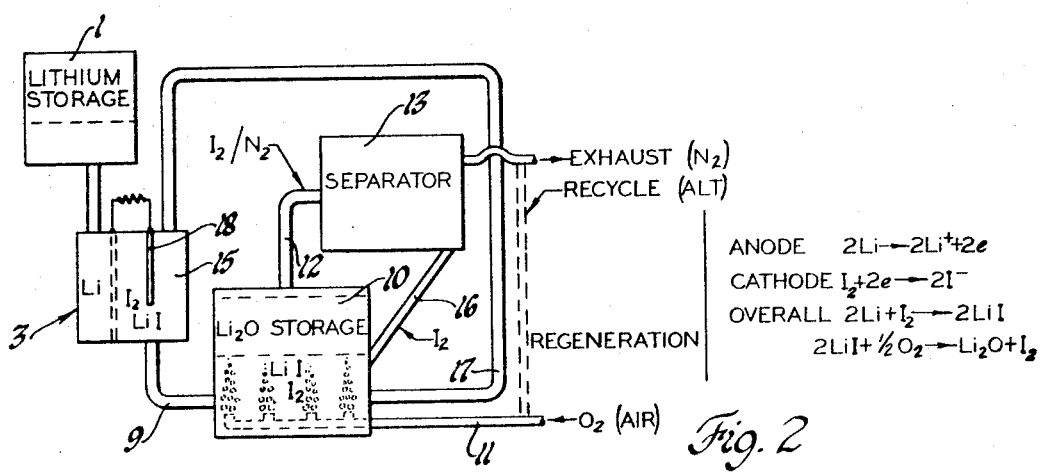
FIGURE 2 is a schematic representation of another system employing this invention.

The system depicted in FIGURE 2 is substantially the same as that of FIGURE 1, differing only in that the iodine is dissolved in the lithium iodide electrolyte in fuel cell 3, as opposed to being separate therefrom as in the system of FIGURE 1. The overall cell reaction is the same. The only significant difference resides in a variation in the piping configuration. Lithium iodide and unreacted iodine are conveyed from the cathode-electrolyte cell chamber 15 via conduit 9 into the iodine regenerator 10. Oxygen or air is admitted to the regenerator 10 via inlet conduit 11 and is bubbled upwardly through the LiI-$I_2$ with which it reacts to form iodine and lithium oxide. The oxide floats to the surface of the molten lithium iodide as discussed in connection with FIGURE 1. A portion of the free iodine liberated is dissolved in the molten pool in the regenerator while the balance of the iodine is transferred to a separator via conduit 12 wherein the iodine is separated from the exhaust or waste gasses. In this system, however, the iodine is returned to the LiI-$I_2$ pool in the regenerator 10 via conduit 16. The iodine is added to the LiI-$I_2$ pool thereby raising the concentration of the iodine therein. Ideally the formation of a saturated solution of $I_2$ in LiI is preferred. This saturated or nearly saturated LiI-$I_2$ is subsequently transferred to fuel cell chamber 15 via conduit 17. The thus formed electrolyte and oxidant are utilized in the fuel cell in a known manner with the electrode 18 serving as the cathode.

In the Li:$O_2$ system of our invention, an operating temperature between 450° C. and 600° C. is selected and the cell brought up to that temperature by passing a large current to the electrodes from an auxiliary current source. The cell could theoretically perform with a maximum current density in the order of 20 amperes per square centimeter, with a corresponding power density of 40 watts per square centimeter. At this power density the weight and volume of the power cell is not a limiting factor. Hence, even at 10 watts per square centimeter, for example, the power cell itself will weigh in the order of 3 lbs. per kilowatt with an open circuit voltage of about 2.5 volts and a normal load voltage of about 2.1 volts. The weight of the active material will be about 1.0 lb. per kilowatt hour at 100% efficiency. The overall weight of the regenerator becomes more or less significant, depending on the size of the system to be employed. Hence, for larger batteries delivering hundreds of kilowatts, weights in the order of 3 lbs. per kilowatt are possible. However, in the smaller batteries this figure will rise considerably owing to the weight of that ancillary equipment which is common to both systems, i.e., valves, tubes, air pumps, etc. The rate or pressure at which the air is pumped to the regenerator varies, of course, with the output of the fuel cell and the rate at which the lithium iodide is being produced. There is nothing particularly critical about the air input rate or pressure as long as there is sufficient air to provide the stoichiometric amount of oxygen required to react solely with the lithium iodide.

Figure 3:
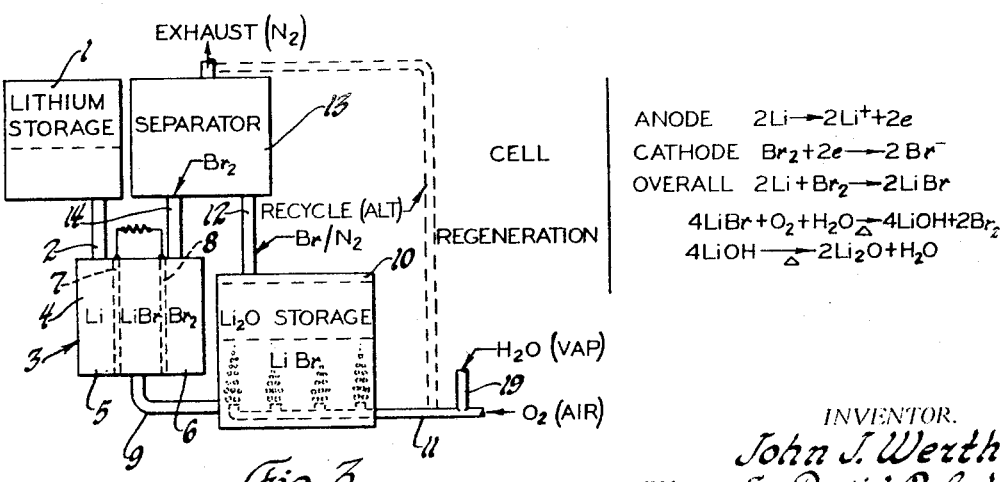
FIGURE 3 is a schematic representation of a system employing another embodiment of this invention.

The system shown in FIGURE 3 is substantially the same as that shown and discussed in conjunction with FIGURE 1, with the exception of the addition of water vapor inlet conduit 19. This particular variation also permits the regeneration of iodine from lithium iodide. In the presence of water vapor, however, the regeneration reaction proceeds as follows:

$$4LiI + O_2 + H_2O \rightarrow 4LiOH + 2I_2$$

While it is unnecessary to add water vapor to the lithium iodide conversion reaction, its addition does become important if the conversion of lithium bromide is desired. In this regard, the reaction:

$$4LiBr + O_2 + 2H_2O \rightarrow 4LiOH + 2Br_2$$

is mildly endothermic and therefore requires a small amount of heat to render it an effective means for releasing the bromine. In the absence of water vapor, however, considerably more external heat is required to effect the regeneration. Hence, in order to effect the regeneration of bromine in a manner consistent with the requirements for low external heat input, water vapor must be added to the regenerator air input.

The addition of heat to the lithium hydroxide formed will, of course, drive off water in accordance with the following equation:

$$4LiOH \xrightarrow{\Delta} 2Li_2O + H_2O$$

if it is desired so to do. As indicated, the latter alternative, relating to the use of water vapor in the reaction, may be used in conjunction with the lithium iodide system. When using this alternative system in conjunction with the lithium iodide system, however, the external heat required to convert the lithium hydroxide to lithium oxide is substantially less than that required when using the lithium bromide system because a portion of the needed heat is continuously transferred from the decomposing lithium iodide to the decomposing lithium hydroxide.

A convenient way of removing the water from the lithium hydroxide is by recycling a part of the nitrogen released by the separator. The nitrogen is mixed with air and the mixture passed through the lithium hydroxide container. The nitrogen-rich air picks up water vapor at the vapor pressure associated with lithium hydroxide at the particular temperature being maintained within the regenerator, i.e., 550° C. If this procedure is followed, it is important that the nitrogen and air be mixed such that the resulting partial pressure of the oxygen bears a stoichiometric ratio (1:2) to the water vapor pressure associated with the lithium hydroxide at the particular operating temperature chosen.

Any one of a variety of means for recharging this system may be employed. Hence, for example, the lithium oxide residue could be dissolved in a fused salt or a eutectric mixture of fused salts and subsequently electrolyzed into free metal and oxygen. Alternatively, the lithium oxide could be converted to lithium chloride or iodide by a displacement reaction and the resulting halide electrolyzed. For simplicity, however, it might be simpler to merely replace the expended lithium tank with a full one and the regenerator or storage tank with an empty one and subsequently recover the lithium in another system.

It is to be understood that although this invention has been described in connection with certain specific embodiments thereof, no limitation is intended thereby except as defined in the appended claims.

We claim:

1. The method of producing an electric current comprising the steps of providing an electrochemical cell having molten lithium as an anode material, a gaseous cathode material selected from the group consisting of iodine and bromine, a molten electrolyte which is the reaction product of said lithium and said cathode material and anode and cathode electrode means for electrochemically reacting said lithium and said cathode material, electrochemically reacting said lithium and said cathode material in said cell to form said reaction product with the development of an EMF, withdrawing said reaction productuct to a cathode material regeneration means, passing an oxygen containing gas upwardly through said reaction product in said regeneration means whereby free cathode material is liberated from said reaction product, passing said free cathode material with said gas to a seperator means, and separating said free cathode material from said gas whereby said free cathode material is made available for reconsumption within said cell.

2. A process in accordance with claim 1 wherein said anode and cathode electrode means separate said electrochemical cell into at least three distinct chambers, said chambers corresponding to anode, cathode and electrolyte chambers respectively.

3. A process in accordance with claim 1 wherein said cathode material is comingled with said electrolyte in said electrochemical cell and said anode electrode means separates said electrochemical cell into at least two distinct chambers, said chambers corresponding to the anode and cathode-electrolyte chambers respectively.

4. A process in accordance with claim 2 wherein said free cathode material is iodine and is cycled back to said cathode chamber of said electrochemical cell for reconsupmtion therein.

5. A process in accordance with claim 3 wherein said free cathode material is iodine and is cycled back to said regenerator, is comingled with said reaction product therein and as thus comingled is cycled to said cathode-electrolyte chamber for reconsumption within said electrochemical cell.

6. A process in accordance with claim 4 wherein the oxygen content of said oxygen containing gas is not substantially in excess of the stoichiometric amount required to chemically react with said reaction product.

7. A process in accordance with claim 6 wherein said oxygen content is not more than about 0.3% by volume after reacting with said reaction product.

8. The process in accordance with claim 5 wherein the oxygen content of said oxygen containing gas is not substantially in excess of the stoichiometric amount required to chemically react with said reaction product.

9. A process in accordance with claim 8 wherein said oxygen content is not more than about 0.3% by volume after reacting with said reaction product.

10. The method of producing an electric current comprising the steps of providing an electrochemical cell having molten lithium as an anode material a gaseous cathode material selected from the group consisting of iodine and bromine, a molten electrolyte which is the reaction product of said lithium and said cathode material, and anode and cathode electrode means for electrochemically reacting said lithium and said cathode material, and anode and cathode electrode means for electrochemically reacting said lithium and said cathode material, electrochemically reacting said lithium and said cathode material in said cell to form said reaction product with development of an EMF, withdrawing said reaction product to a cathode material regeneration means passing an oxygen and water vapor containing gas upwardly through said reaction product in said regeneration means whereby free cathode material is liberated from said reaction product, passing said free cathode material with said gas to a separator means, and separating said free cathode material from said gas whereby said free cathode material is made available for reconsumption within said cell.

11. A process in accordance with claim 10 wherein said anode and cathode electrode means separate said electrochemical cell into at least three distinct chambers, said chambers corresponding to anode, cathode and electrolyte chambers respectively.

12. A process in accordance with claim 10 where said cathode material is comingled with said electrolyte in said electrochemical cell and said anode electrode means separates said electrochemical cell into at least two distinct chambers, said chambers corresponding to the anode and cathode-electrolyte chambers respectively.

13. A process in accordance with claim 11 wherein the oxygen and water vapor content of said oxygen and water vapor containing gas is not substantially in excess of the stoiciohmetric amount required to chemically react with said reaction product.

14. A process in accordance with claim 12 wherein the oxygen and water vapor content of said oxygen and water vapor containing gas is not substantially in excess of the stoichiometric amount required to chemically react with said reaction product.

15. In a system for producing electrical energy from the electrochemical reaction of lithium and a cathode material selected from the group consisting of iodine and bromine said system comprising lithium storage means, electrochemical cell means, cathode material regeneration means, and cathode material separation means, the improvement comprising a cathode material regeneration means which is adapted to receive reaction product from said cell and comprises a chamber for the collection and chemical conversion of reaction product formed in said electrochemical cell reaction product input means, free cathode material output means and conversion gas inlet means which conversion gas inlet means is located at substantially the lowest point of said chamber which permits maximum distribution and dissipation of said gas through said reaction product in said chamber.

References Cited
UNITED STATES PATENTS

| | | | |
|---|---|---|---|
| 2,163,877 | 6/1939 | Hooker | 23—216 |
| 3,009,327 | 11/1961 | Weil | 136—86 X |
| 3,031,518 | 4/1962 | Werner et al. | 136—86 |
| 3,088,990 | 5/1965 | Rightmire et al. | 136—86 |
| 3,169,830 | 2/1965 | Du Bois | 23—216 |
| 3,214,296 | 10/1965 | Smatko | 136—86 |

ALLEN B. CURTIS, Primary Examiner

U.S. Cl. X.R.

23—216

PO-1050
(5/69)

UNITED STATES PATENT OFFICE
CERTIFICATE OF CORRECTION

Patent No. 3,455,744          Dated August 27, 1969

Inventor(s) John J. Werth et al

It is certified that error appears in the above-identified patent and that said Letters Patent are hereby corrected as shown below:

Column 2, line 28, "meltisg" should read -- melting --.

Column 5, line 71, insert a comma (,) after "material".

Column 6, line 2, "uctuct" should read -- uct --; same column, line 24, "supmtion" should be -- sumption --; same column, lines 53-55, delete "and anode and cathode electrode means for electrochemically reacting said lithium and said cathode material,"; same column, line 58, insert a comma (,) after "means"; same column, line 72, "where" should be -- wherein --.

Column 7, line 6, "stoiciohmetric" should be -- stoichiometric --.

Column 8, line 2, insert a comma (,) after "cell".

SIGNED AND
SEALED
MAY 12 1970

(SEAL)
Attest:

Edward M. Fletcher, Jr.
Attesting Officer

WILLIAM E. SCHUYLER, JR.
Commissioner of Patents